United States Patent [19]
Seifert et al.

[11] 3,959,152
[45] May 25, 1976

[54] TRACTION-DRIVEN COMPOSITE SLUDGE RAKING MECHANISM FOR SEDIMENTATION TANKS

[75] Inventors: Jay A. Seifert, Stamford, Conn.; Donald R. Hill, Port Chester; Michael Smith, Hartsdale, both of N.Y.

[73] Assignee: Dorr-Oliver Incorporated, Stamford, Conn.

[22] Filed: Mar. 17, 1975

[21] Appl. No.: 559,141

Related U.S. Application Data

[63] Continuation of Ser. No. 429,376, Dec. 28, 1973, abandoned.

[52] U.S. Cl. ............................... 210/530; 210/531
[51] Int. Cl.² ......................................... B01D 21/14
[58] Field of Search ............ 210/523, 525, 527–531

[56] References Cited
UNITED STATES PATENTS

| | | | |
|---|---|---|---|
| 1,434,596 | 11/1922 | Dorr | 210/530 |
| 2,122,385 | 6/1938 | Scott | 210/528 |
| 3,241,682 | 3/1966 | Cookney et al. | 210/528 |
| 3,295,835 | 1/1967 | Klopper | 210/528 X |
| 3,482,704 | 12/1969 | Jablon | 210/531 |
| 3,498,468 | 3/1970 | Raynor | 210/528 |
| 3,542,207 | 11/1970 | Stansmore | 210/528 X |

FOREIGN PATENTS OR APPLICATIONS

| | | | |
|---|---|---|---|
| 729,462 | 5/1955 | United Kingdom | 210/528 |
| 786,807 | 11/1957 | United Kingdom | 210/530 |

*Primary Examiner*—Charles N. Hart
*Assistant Examiner*—Robert H. Spitzer
*Attorney, Agent, or Firm*—Theodore M. Jablon; Burtsell J. Kearns

[57] ABSTRACT

A large sedimentation tank having a traction-driven composite sludge raking mechanism provided with lift capability, and comprising a rotary traction-driven drive arm of girder-like construction exposed above the liquid level, and draft-connected to an inner load yielding self-liftable rake arm operating in the central sludge accumulation zone in the tank, and also connected to an outer complementary rake structure operating in an outer annular zone to move sludge therefrom into the central accumulation zone.

16 Claims, 14 Drawing Figures

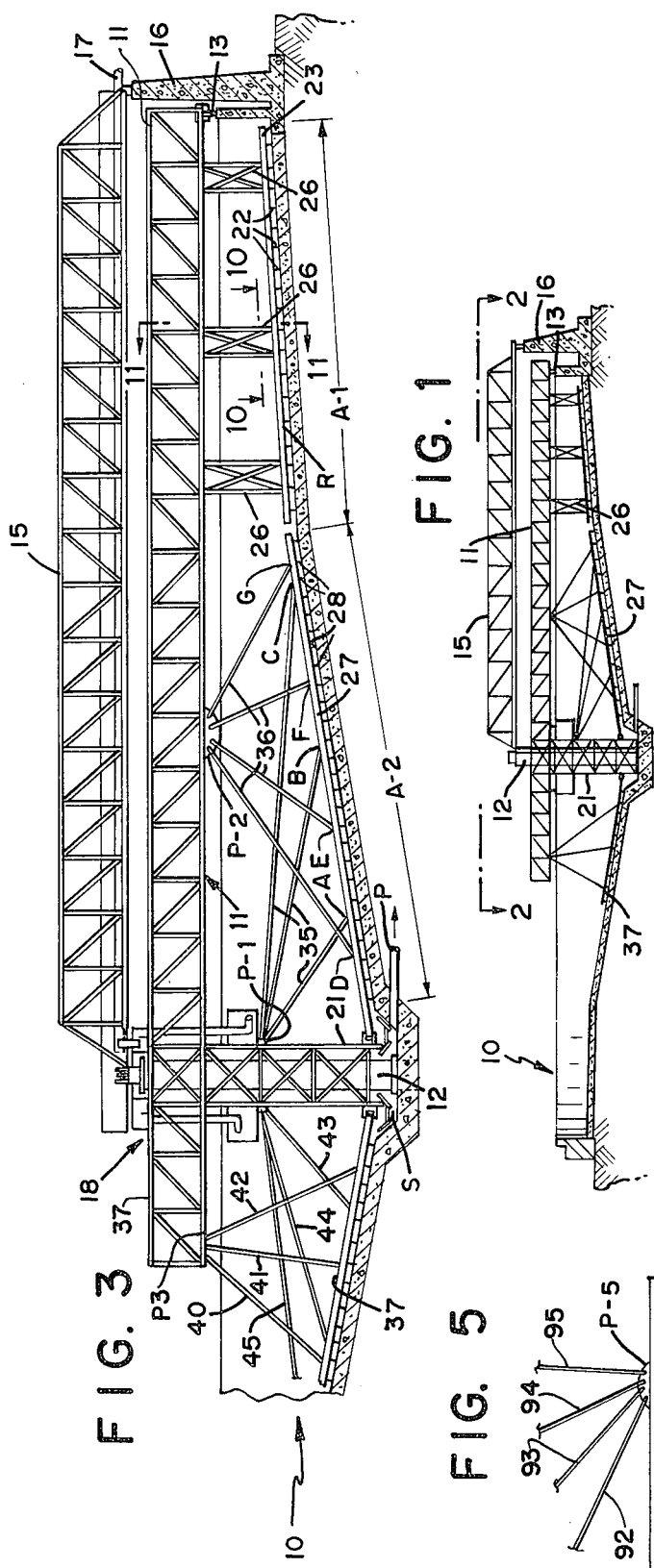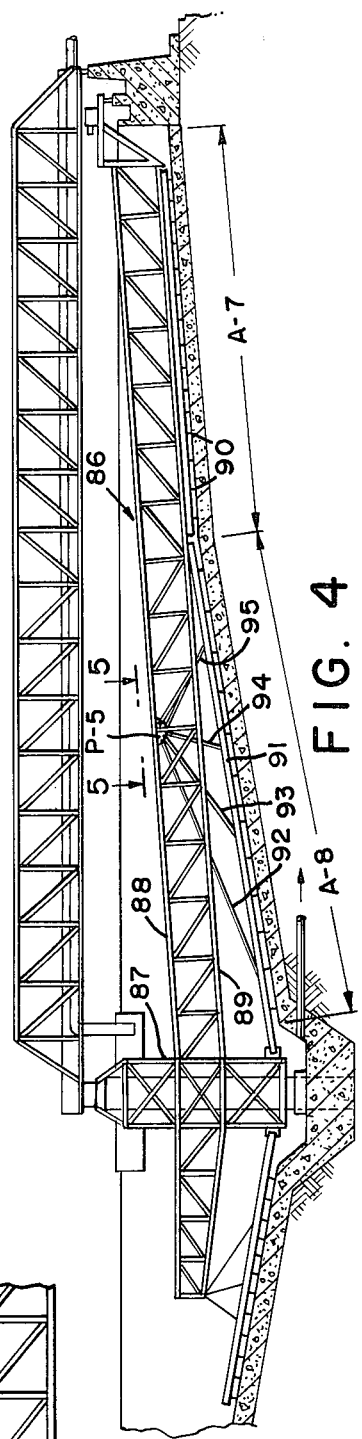

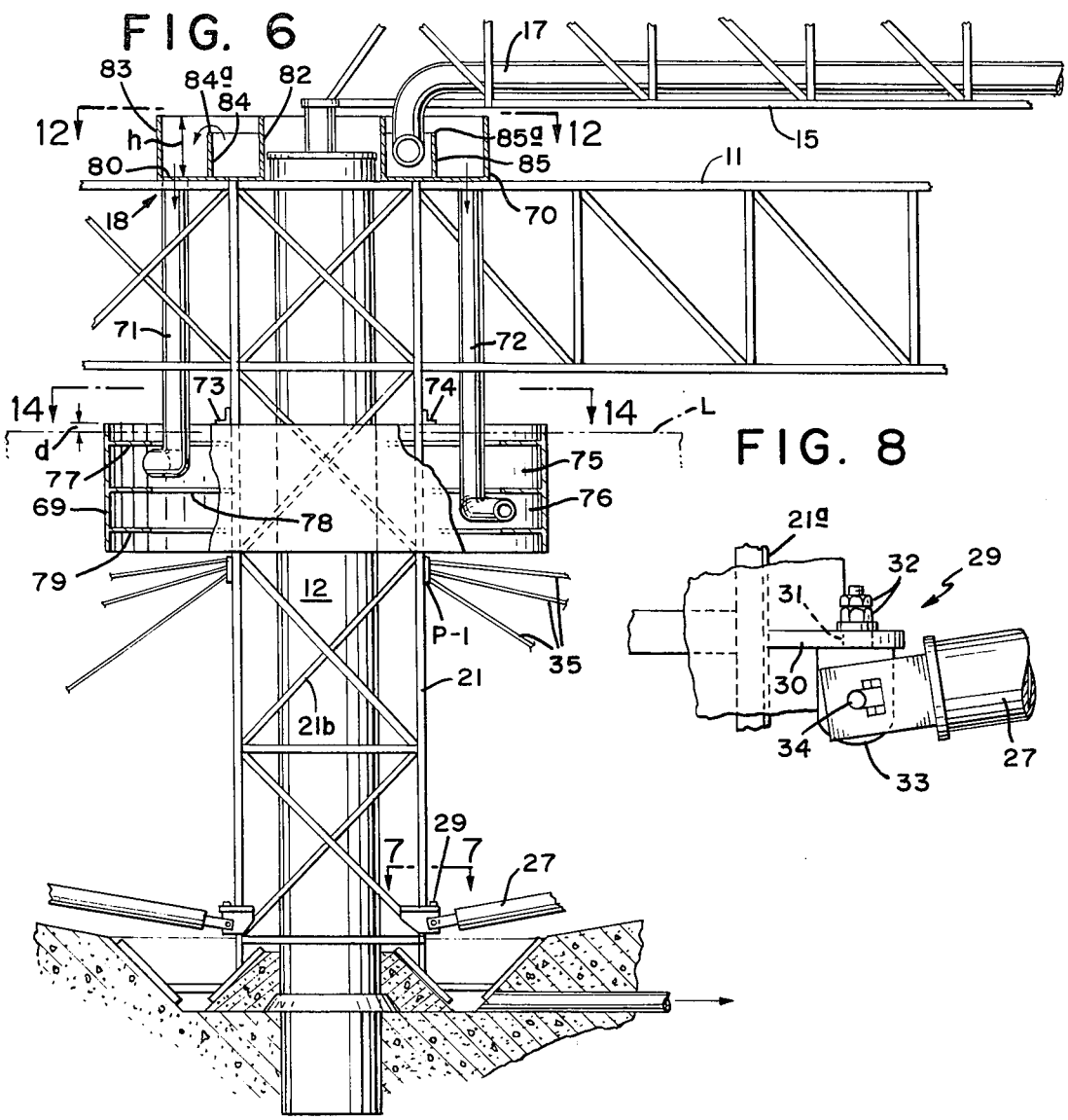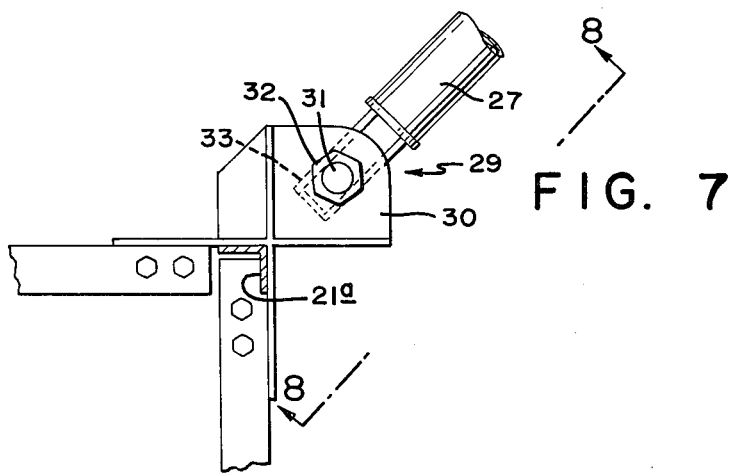

TRACTION-DRIVEN COMPOSITE SLUDGE RAKING MECHANISM FOR SEDIMENTATION TANKS

This is a continuation, of application Ser. No. 429,376, filed Dec. 28, 1973, now abandoned.

This invention relates to continuously operating sedimentation tanks wherein a rotating rake structure moves the sediment or sludge over the tank bottom to a central outlet zone or sump, while supernatant liquid overflows into a peripherally extending launder.

Usually, a feed slurry or solids suspension is supplied continuously to a central feed-well in the tank, while sludge is pumped from the sump, and supernatant liquid overflows.

More in particular, the invention is concerned with improvements pertaining to large sedimentation tanks for instance in a size range of 300 ft. to 500 ft. diameter, and possibly even larger, where the use of a traction-driven rake structure is indicated, in preference to self-contained pier-supported rake structures requiring a central pier-supported drive head to supply the necessary driving torque. This later type of rake structure may become unwieldy, and uneconomical structurally as well as with respect to torque requirements, when considering those large size tanks.

With respect to this latter type, attempts have been made to overcome such limitations, for example as shown in the U.S. Pat. Nos. to Scott 2,122,385 and 2,122,383, both featuring freely centilevering rake arms constructed and arranged to automatically yield and override excessive sludge accumulations, but neither one of which has been as satisfactory functionally and structurally as the sludge raking mechanism shown in U.S. Pat. Nos. to Klopper 3,295,835 referred to below, although all of these have practical tank size limitaions.

By comparison, the traction type thickener as a class defy the aforementioned size limitations, largely because of the endwise support of the rake arm structure, and the provision of the wheel-supported self propelled outer end of the arm.

This invention therefore is concerned with improvements in the raking mechanism of the conventional traction type sedimentation tanks, briefly "Traction Thickeners", as exemplified in U.S. Pat. Nos. to Dorr 1,356,608 of 1920. In this earlier type, the outer end of a rotating rake arm of girder-like construction rests on a carriage that is selfpropelled upon a peripheral track.

Supporting the inner end of the rake arm, and connected rigidly therewith is a vertical cage structure surrounding the pier, and provided with a vertical thrust bearing at the top.

In operation, this girder-like rake arm structure is fully submerged, with the upper horizontal truss of the girder extending adjacent the plane of the overflow level of the tank, and the lower truss substantially conforming to the bottom profile of the tank. In such large tanks it is customary and economical as well as technically sound to have the bottom profile comprise a shallow outer annular portion of only slightly inclined inverted frusto-conical shape, surrounding a central sludge accumulating area of a substantially deeper conical shape, with an annular "break" representing the intermediate line of demarkation.

Sludge raking blades are fixed directly to the underside of the lower truss. A very rugged rigid rake arm structure of this type was required to withstand excessive raking loads and sludge accumulations occurring mainly in the central bottom area of so large a tank. This problem was aggravated when handling heavy metallurgical and viscous sludge, provided that slippage between the carriage and the track was avoided, and the raking load not so excessive as to cause overload responsive devices to stop the operation.

Conventionally, the carriage is driven by a gear motor receiving its power supply through a slide contact provided upon the center pier, interconnecting an inleading cable extending along a stationary radial walkway or access bridge, with an outleading cable extending along the rotating rake arm structure. A feed pulp supply channel or pipe is carried by the bridge.

This carriage requires drive means sufficiently powerful to cope with the aforementioned loads or sludge accumulations in so large a tank even though protected by overload responsive devices to stop the operation in case of excessive overloads.

Therefore, it is one object of this invention to provide a traction-driven rake mechanism for large diameter tanks, capable of handling and resolving the aforementioned loads or sludge accumulations, with minimum power requirements for maintaining uninterrupted operation, and by the same token to preserve and maintain the roller traction force of the self-propelled carriage against slippage.

A further object is to provide lift capability to the rake mechanisn of a traction-driven unit of a large sedimentation tank.

Another object is to provide such a traction-driven rake mechanism to be of relatively light construction, and requiring a minimum of submerged corrosion resistant expensive parts usually of stainless steel, for operation in corrosive liquids.

In conjunction with the above stated objectives, the invention is furthermore concerned with the problem to overcome limitations inherent in the above mentioned rotary rake structure of Klopper U.S. Pat. No. 3,295,835, featuring a rake arm structure of great simplicity and low torque requirement, and capable of yielding to overloads to resolve excessive sludge accumulations, but for practical reasons limited to tank sizes much smaller than those contemplated for the traction thickener of this invention.

In the Klopper patent, a linear or straight tubular bladed rake arm has a compound hinge connection between its inner end and the lower end of a vertical drive shaft. This hinge connection is constructed to allow the arm to swing vertically as well as horizontally, while preventing rotation of the arm about its own longitudinal axis. Sloping guy wires connect the rake arm with the upper end portion of the shaft so as to maintain the raking blades of the arm clear of the tank bottom under normal sludge raking conditions.

A horizontal drive arm extends rigidly from the upper end portion of the vertical drive shaft. A downwardly and rearwardly sloping draft element connects the drive arm with the rake arm, causing the rake arm to follow the drive arm in its rotation, while the compound hinge connection allows the rake arm to yield and override any undue sludge accumulations, thus gradually allowing the same to become resolved.

However, for practical reasons, the Klopper type of linear rake arm structure is limited to only a length at which its weight can still be supported effectively by the sloping guy wires.

Moreover, if the length of such a rake arm were to be extended well beyond such a practical limit, its overall raking capacity would be impaired, with the outer end of the arm rising much higher than desired, when yielding to excessive sludge accumulations. Yet further, it would be difficult or at least awkward to attempt to adapt this tubular rake arm to the aforementioned "break" in the bottom contour of those large size tanks, compounding the guy wire supporting problem.

All of the foregoing problems are solved by this invention, due to the provision of a traction-driven composite rake structure embodied in a novel combination which comprises:

a. a traction-driven drive arm of girder like construction which may be located exposed above the overflow level of the tank, and having a center cage with bearing supporting its inner end upon a pier;

b. a load-responsive yieldable rake structure to operate in the inner sludge accumulation zone, comprising the aforementioned linear rake arm derived from the above outlined Klopper rake mechanism, with a compound-hinge connecting it to the lower end of the center cage, and with draft elements connecting it to the traction-drive girder arm above, to handle sludge accumulations, while insuring continuity of operation, and c. an outer complementary rake structure extending downwardly from the outer end portion of the drive arm, whereby a relatively light sludge load from an outer annular shallower bottom zone is moved into a central inner deeper accumulation zone, to join the sludge that settles directly into the inner zone.

The foregoing concept of a novel combination embodied in the composite sludge raking mechanism, incorporates the structural advantages and functional effectiveness of the load-yielding linear rake member, without exceeding its practical size limitations, to operate in the critical central sludge accumulation area of the tank, and to resolve potential sludge overloads.

The surrounding bottom area is served by the auxiliary outer rake structure for moving the outer lighter portion of the sludge load into the central zone of sludge accumulation.

The traction-driven girder which may be elevated to a position above the overflow level of the tank, thus provides the common motivating member or drive arm for the complementary outer end rake structure and for the draft-connected yieldable sludge conveying arm.

As a result, the composite raking mechanism as a whole is relatively lightened, while the extent of submergence is minimized, combined with lessened drive torque requirements and assured continuity of operation. Moreover, the composite rake mechanism in this combination is readily adaptable to the profile of the tank bottom involving the aforementioned intermediate "break", while only a minimum of submerged structure is located in a position where it must react against being dragged through more viscous sludge material.

Specific features reside in the provision of supplemental load-responsive means integrated into the composite raking mechanism of the invention to provide additional sludge raking capacity in the central sludge accumulation zone.

Other specific features are concerned with the provision of means for efficient feed introduction into the tank, integrated into the composite rake mechanism of this invention.

As this invention may be embodied in several forms without departing from the spirit or essential characteristics thereof, the present embodiment is illustrative and not restrictive.

The scope of the invention is defined by the appended claims rather than by the description preceding them, and all embodiments which fall within the meaning and range of equivalency of the claims are therefore intended to be embraced by those claims.

FIG. 1 is a schematic vertical sectional view of the settling tank, showing one embodiment of the invention in a center pier supported traction-driven sludge raking mechanism.

FIG. 3 is a side view of the raking mechanism, taken on line 3—3 of FIG. 2.

FIG. 4 is a side view similar to FIG. 3 of the raking mechanism according to another embodiment of the invention.

FIG. 5 is a detail plan view of the rake arm taken on line 5—5 of FIG. 4, showing the attachment of drag elements for the rake member.

FIG. 6 is an enlarged vertical sectional view of the center pier supported cage portion of the raking mechanism, and of a composite feedwell construction rotating therewith, showing a main feed well receiving feed slurry from an auxiliary feed well above.

FIG. 7 is a enlarged cross-sectional view of a double hinge connection of the raking mechanism, taken on line 7—7 of FIG. 6.

FIG. 8 is a side view taken on line 8—8 of FIG. 7.

Figure 2:
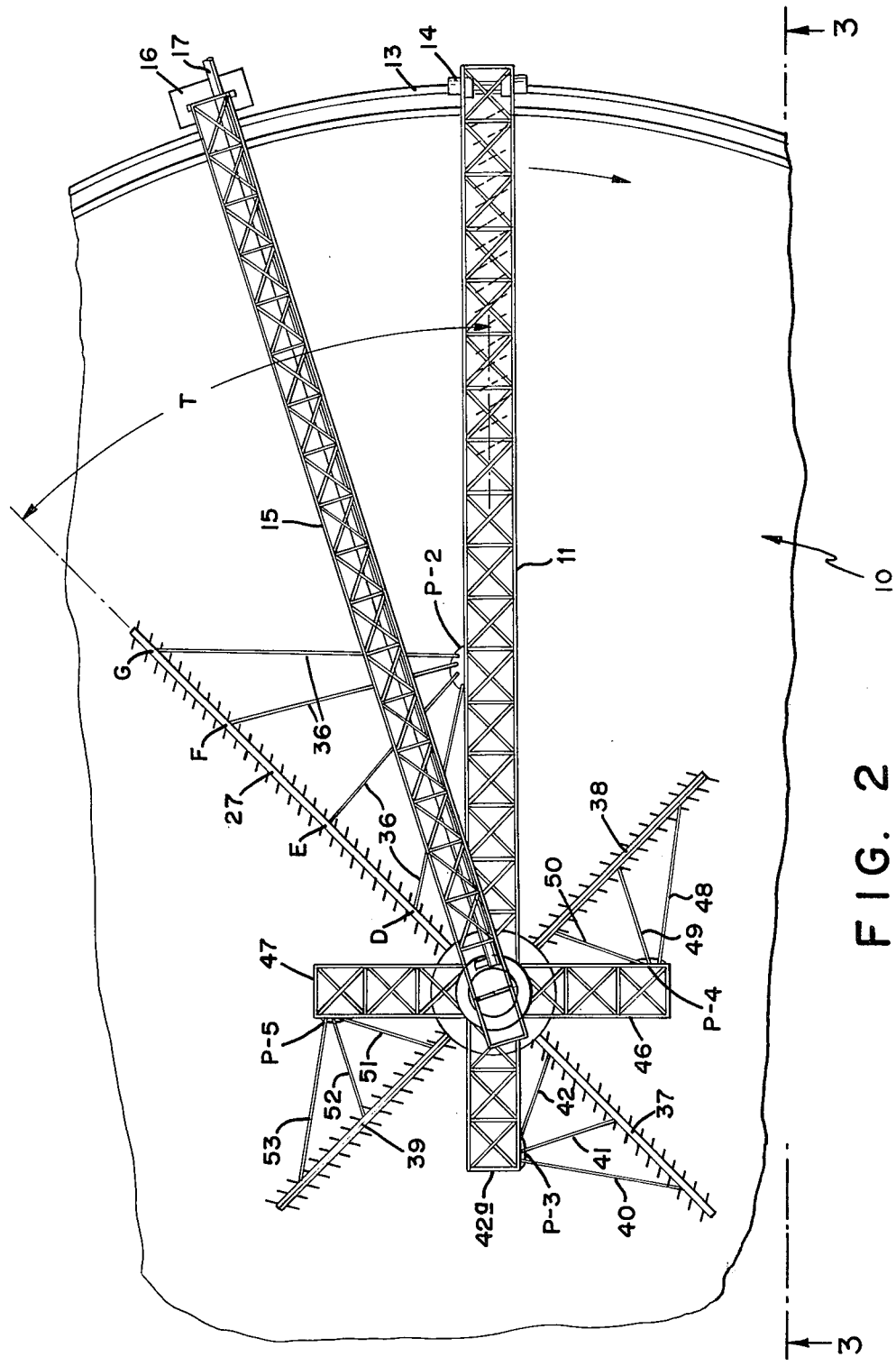
FIG. 2 is a fragmentary plan view of the raking mechanism, taken on line 2—2 in FIG. 1.

As exemplified in FIGS. 1, 2 and 3, the invention is embodied in a settling tank 10 of relatively large diameter for example in the order of 250 ft. or larger, having a traction driven rotating sludge raking mechanism of the general type exemplified in U.S. Pat. No. to Dorr 1,356,608.

In this mechanism, the inner end of a rotating girder type rake arm structure 11 is supported upon a center column or pier 12, for instance by means of a known self-adjusting spherical thrust bearing later on to more fully disclosed by reference to FIGS. 6 and 9. The outer end of the rake arm structure operates upon a peripheral track 13 provided atop the wall of the settling tank, and is propelled thereon by an otherwise known motorized traction driven carriage or mechanism indicated at 14 in FIG. 2.

A stationary girder type access bridge structure 15 extending above the rake arm, has one end supported upon the center pier, while the other end rests upon a support column 16 located outwardly adjacent to the circular wall of the tank. This bridge carries the feed supply conduit 17 delivering the pulp or feed suspensions to the composite feedwell construction 18 surrounding the center pier, and furthermore to be described by reference to FIGS. 6 and 9. Also carried by the bridge is an inleading cable 19 which via slide contact rings (see FIG. 9) connects to an outward leading cable 20 carried by the rake arm structure to energize the motor of the traction driven mechanism.

As shown in this example (See FIG. 3), the shape of the tank bottom comprises an outer annular settling area A-1 of shallow slope, surrounding an inner annular area A-2 of an adequately steeper conical incline, which in turn surrounds an annular sump S around the center pier 12. The shallow slope of the outer area is for receiving the lighter portion of the sludge load to be moved inwardly by the rotating rake structure, while the area of steeper conical incline is adequate to handle the accumulating heavy portion of the load.

A usual sludge withdrawal pipe P delivers collected sludge from the sump.

There now follows a more detailed description of the rake structure and its associated parts, embodying one form of this invention.

Figure 11:
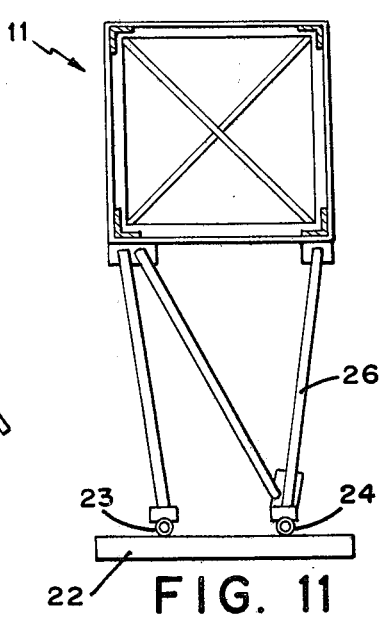
FIG. 11 is another cross-sectional detail view of the raking mechanism taken on line 11—11 in FIG. 3.

A preferred rotating girder 11 structure for the aforementioned large size tank may be of relatively simple and relatively light construction and otherwise constructed in the manner indicated in FIG. 11. This girder 11 rigidly extends from a vertical cage structure 21 surrounding the center pier (see FIGS. 3 and 6) supported upon the pier by the aforementioned self-adjusting bearing to be furthermore described by reference to FIG. 9. The cage structure 21 square shaped in cross-section, is generally defined by vertical corner members 21a (see FIG. 14) interconnected by suitable diagonal bracing members 21b (see FIG. 6).

A novel combination of sludge raking means according to this invention, enables the traction-driven raking mechanism to handle heavy sludge loads or accumulations in large size tanks with relative ease, that is to say, without requiring undue traction force such as may result in track slippage of the traction drive, yet with a lighter rotary girder arm construction as compared with prior art rake mechanisms for comparable tank sizes.

This is accomplished by a combination of a composite raking mechanism wherein a traction driven girder arm structure is combined with two different types of sludge engaging raking means each to operate in their respective annular bottom zones A-1 and A-2, each with optimum effectiveness.

Figure 10:
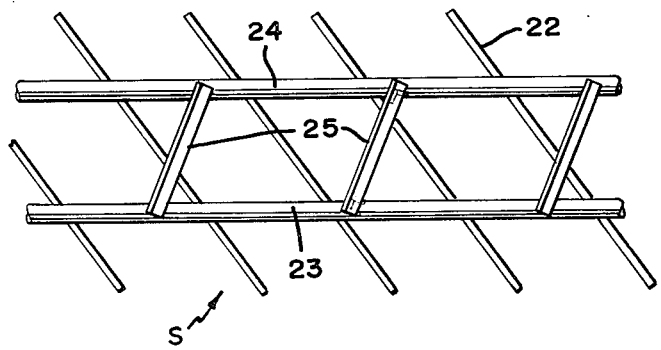
FIG. 10 is a cross-sectional detail view of the raking mechanism taken on line 10—10 in FIG. 3.

Accordingly, for handling the lighter sludge load in the outer settling zone A-1, a set of plowing raking blades is rigidly connected to the outer end of the girder. In the embodiment of FIGS. 3, 10 and 11, such raking blades 22 are connected or welded to a pair of horizontally spaced parallel stringers 23 and 24 which in turn are further rigidly interconnected by means of horizontal cross members 25. This rake structure designated S comprising parts 22, 23, 24 and 25, is rigidly connected to the girder arm above, for instance by vertical frame structures 26 such as indicated in FIGS. 3 and 11.

The much heavier sludge accumulation in the inner settling zone A-2 is handled effectively and without overload risk by a yieldable rake arm 27 of linear or tubular configuration, to which are fixed or welded a series of plowing raking blades 28 (see FIG. 3). The inner end of the yieldable arm 27 is connected to the lower end of the vertical cage structure 21 by means of a double hinge device 29 indicated in FIG. 6, and more clearly in the enlarged details of FIGS. 7 and 8.

The double hinge device in this embodiment comprises a horizontal bracket plate 30 fixed to a corner member 21a of the vertical cage structure. A vertical pin or pivot member 31 in this bracket plate is secured in place as by nuts 32 at the top.

At the bottom, this pin has an inverted head portion or vertical plate 33 to which the auxiliary rake arm 27 is hinged by means of an horizontal pin or pivot member 34.

This double hinge connection allows the linear rake member 27 to swing up and down as well as laterally, but is prevented from rotating about its longitudinal axis. For this rake arm to become operative, there is provided a set of divergent guy wires 35 (see FIG. 3) connecting an intermediate point P-1 of the cage structure with points A, B, C of the rake arm. These guy wires support the weight of the arm, while normally maintaining it clear of the tank bottom, when in its lowermost position. A set of rearwardly inclined divergent drag-or draft elements 36 (see FIGS. 2 and 3) connects a point P-2 (see FIG. 2) of the traction driven girder with points D, E, F, G of the rake arm 27.

The rake arm 27 thus connected to the cage portion and to the drive arm or girder 11 respectively, under normal load conditions will travel or trail behind the traction driven girder 11 as indicated by angle T in FIG. 2. But when excessive sludge accumulation is encountered, this arrangement allows the rake arm to yield and override obstructions while nevertheless continuing in its sludge conveying function.

However, for practical reasons previously set forth, the length of the yieldable rake arm and its raking capacity are limited. Therefore, in the large settling tank equipped with the composite rake mechanism of the invention, and with the outer rakes in zone A-1 adding to the sludge accumulation in the inner zone A-2, additional raking capacity may be provided to cope with that accumulation.

For that purpose (see FIGS. 2 and 3), the rake mechanism is shown to comprise a set of auxiliary short rake arms 37, 38 and 39 constructed and arranged to operate in the manner of the yieldable rake arm 27. Accordingly, the rake arm 37 has draft elements 40, 41 and 42 connecting it with point P-3 of a foreshortened auxiliary rake arm 42a which extending from the cage structure appears as a rearward structural girder-like extension of the traction driven girder arm 11. While yieldable by way of a double hinge connection similar to the one described above, the weight supporting guy wires for this rake arm are indicated at 43, 44 and 45 respectively in FIG. 3.

A pair of similar foreshortened auxiliary arms 46 and 47 extend in opposite direction to each other and at right angles to arms 11 and 42a. A set of draft elements 48, 49 and 50 connect the rake arm 38 with a point P-4 of auxiliary drive arm 46. Similarly a set of draft elements 51, 52 and 53 connect the rake arm 39 with point P-5 of auxiliary drive arm 47. It will be understood that the auxiliary yieldable rake arms 38 and 39 are provided each with their own weight supporting guy wires extending in a vertical plane when the rake arms are in their lowermost or normal raking position, similar to guy wires 43, 44 and 45 (see FIG. 3) shown to support the rake arm 37.

Figure 9:
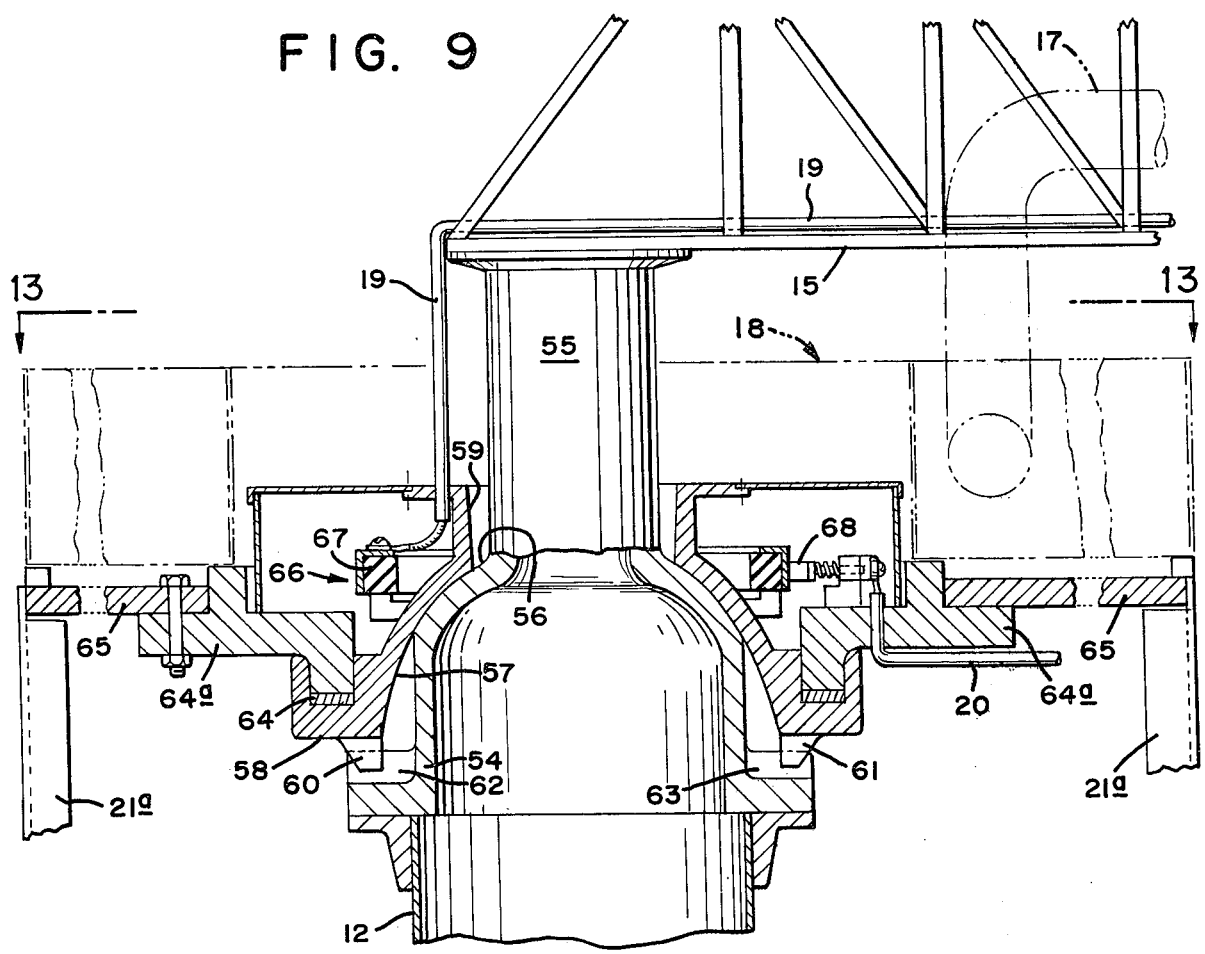
FIG. 9 is an enlarged vertical sectional view of the center support bearing means of the raking mechanism, taken from FIG. 6.

As shown in FIGS. 6 and 9, an example of the self-adjusting spherical bearing supporting the inner end of the traction driven girder arm and rake structure, comprises a hollow bearing base member 54 bolted to the top end of the center pier or column 12. This bearing base member is in the form of an inverted flanged cup having an upward cylindrical extension 55 providing in effect an upward extension of the center column, for supporting the access bridge 15.

An annular spherical bearing face 56 of this base member cooperates with, and is engaged by the inner spherical face 57 of the surrounding bell shaped bearing member 58 which has a top opening 59 accommodating said extension 55. This outer bearing member is self-adjusting spherically, but has rotation preventing lugs 60 and 61 cooperating with lugs 62 and 63 provided on the bearing base member 54.

Figure 13:
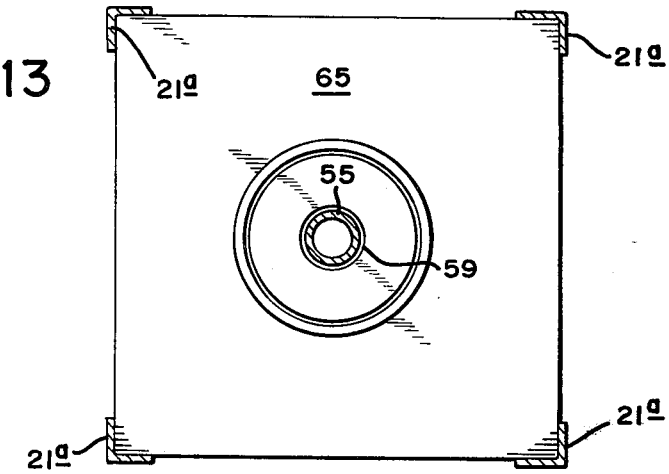
FIG. 13 is a cross-sectional view taken on line 13—13 in FIG. 9, showing the top end portion of the cage structure.

The outer bearing member 58 has a peripheral bottom portion forming an annular thrust bearing 64 supporting a horizontal bearing plate 64a bolted to a surrounding square shaped frame member 65 which in turn constitutes the top end of the cage structure 21 (as also seen from FIG. 13).

A slide contact device 66 connects the inleading cable 19 with the outleading cable 20, schematically shown to comprise a contact ring 67 mounted on the outer spherical bearing member 58, and contact brushes 68 mounted on the annular bearing plate 64a rotating with the cage structure 21.

The slurry feed pipe 17 supported on the access bridge 15 delivers to the composite feedwell construction 18 mounted on the rake structure and rotating therewith.

The composite feedwell construction generally speaking is similar to one shown in U.S. Pat. No. 3,542,207, to Stansmore comprising a main feedwell 69 (see FIG. 6) and an auxiliary feedwell 70 which has a pair of downwardly directed feed pipes or downcomers 71 and 72 delivering respectively half portions of the feed slurry into the main feedwell under a head as represented by the length or vertical height of these pipes.

Figure 14:
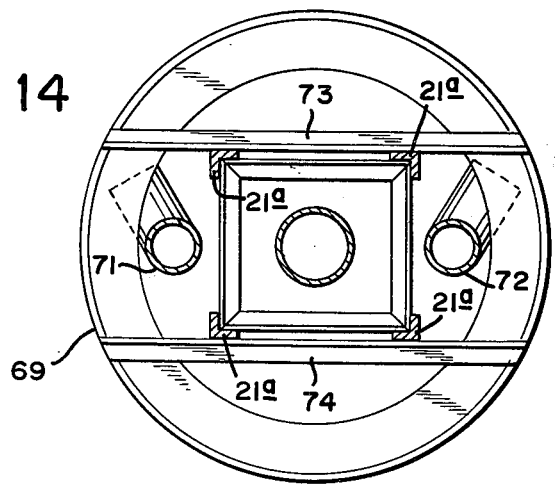
FIG. 14 is a cross-sectional view taken on line 14—14 in FIG. 6, showing the main feedwell from the top.

The main feedwell 69 (see FIGS. 6 and 14) is connected to the cage structure 21 as indicated by horizontal support member 73 and 74 (see FIG. 14). Normally, this feedwell is submerged with only a top edge portion $d$ shown to extend above the tank overflow level L.

Internally, this feedwell is formed with a pair of annular channels 75 and 76 providing concentric annular horizontal raceways one above the other, for the two countercurrently directed streams of feed slurry from pipes 71 and 72. These raceways are defined by three horizontal annular baffles 77, 78 and 79.

Accordingly, from these pipes two separate streams of the feed slurry having velocity energy are fed into the respective annular channels or raceways, each in a direction opposite to the other. Thus the two influent streams are directed into annular countercurrent paths located one above the other, and in such a manner that the influent energy is dissipated, and the feed pulp is distributed radially evenly in all directions, while entering the surrounding body of liquid undergoing sedimentation.

Figure 12:
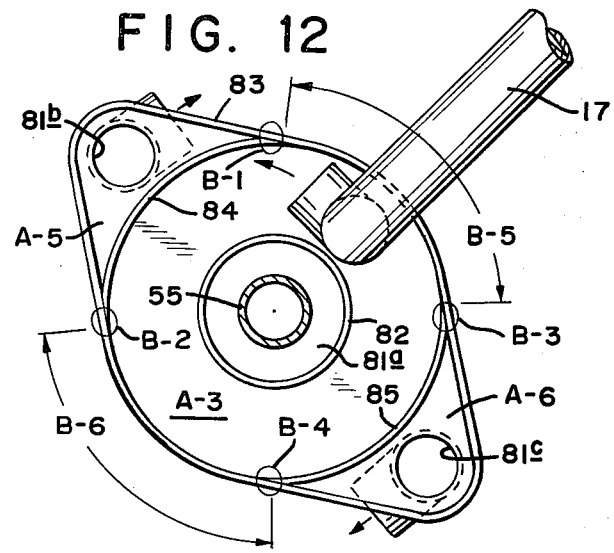
FIG. 12 is a cross-sectional view taken on line 12—12 in FIG. 6, showing a top view of the auxiliary feedwell.

The auxiliary feedwell 70 (see FIGS. 6, 9 and 12) comprises a bottom plate 80 mounted atop the cage structure 21, and surrounding the spherically self-adjusting bearing described above. The bottom plate therefore has a central opening 81a and a pair of symmetrically disposed eccentric openings 81b and 81c connected to the respective aforementioned downcomers 71 and 72. An inner cylindrical wall 82 is connected to the central opening, concentric with the center column 12. An outer peripheral wall 83 extends along the edge or peripheral contour of the bottom plate, shown as of the same height $h$ as the inner cylindrical wall 82. A pair of arcuate lower walls 84 and 85 provide overflow weirs 84a and 85a (see FIG. 6).

These arcuate walls or weirs merge at points designated B-1, B-2, B-3, and B-4 with respective adjacent arcuate portions B-5 and B-6 of the peripheral wall, and define therewith and with the inner cylindrical wall 82, an annular feedwell area A-3 receiving feed slurry from feed pipe 17. That is to say, feed slurry overflow the two arcuate weirs 84a and 85a in opposite directions into respective receiving areas A-5 and A-6, then plunging through the two downcomer pipes into the main feedwell 69 below.

In this way, there is achieved an effective introduction of feed slurry from the stationary feed pipe 17 located on the bridge, into the body of liquid undergoing sedimentation, by way of the composite rotating feedwell construction 18 described above.

In FIG. 4, the invention is embodied in a rake mechanism which differs from the embodiment of FIGS. 1 to 3, in that the rotary rake structure comprises a traction driven rake arm 86 connected to an intermediate portion of a vertical cage structure 87, and otherwise arranged to be submerged in the body of liquid undergoing sedimentation. This embodiment allows for correspondingly decreasing the height of the center column, and the elevation of the access bridge, as well as the height to which the feed slurry must be pumped.

This submerged low level girder is of simple and relatively light construction, having parallel upper and lower chords 88 and 89, in this respect resembling the emerged or high level girder arm of FIGS. 1 to 3. Yet, its low level submerged arrangement allows for raking blades 90 operating in the outer bottom zone A-7, to be fixed directly to the lower chord 89.

A yieldable rake arm 91 is supported and operates in the inner bottom area A-8, in the manner similar to the one in FIGS. 1 to 3. Accordingly, there are shown draft elements 92, 93, 94 and 95 connecting the rake arm 91 with point P-5 on trailing side of the upper chord 88.

By way of comparison of the two embodiments of FIG. 3 and FIG. 4, it should be understood that the high level girder arm arrangement in FIGS. 1 to 3 is of practical importance where the liquid undergoing sedimentation is of a corrosive nature requiring the use of expensive corrosive resistant steel for the submerged parts of the rake structure. The high level emerged position of the girder arm of FIGS. 1 to 3, although requiring the vertical connecting frame structure 26 for the fixed raking blades, minimizes the expense for the corrosive resistant steel.

We claim:

1. In a continuously operating large diameter settling tank having means for supplying feed slurry to the tank, sediment discharge means at the foot of a center pier, and overflow means for supernatant liquid, the combination which comprises a center pier, a vertical cage structure surrounding said pier, and supported upon said pier by a thrust bearing at the top thereof for rotation about a vertical axis, a main drive arm of girder type construction having an upper and a lower truss and its inner end rigidly connected to said cage structure to rotate therewith, and having, its outer end supported by a track for travel along the periphery of the tank, means for propelling the outer end of said drive arm along said track, for rotation together with said cage structure, a bladed rake arm extending from the lower end of said cage structure, and by its length defining the radius and extent of an inner bottom zone of sedimentation sludge accumulation around said pier, surrounded by an outer annular bottom sedimentation zone, with the outer end portion of said drive arm extending a significant distance beyond said inner zone and radially across said outer zone, hinge means connecting the inner end of said bladed rake arm to the lower end of said cage structure, constructed and arranged so as to allow said rake arm to swing from a predetermined lowermost normal raking position rearwardly upwardly along a predetermined path, while preventing said rake arm from rotating about its own longitudinal axis, a sloping guy wire connecting said rake arm with the upper end portion of said cage structure, and normally extending in a substantially vertical plane, said guy wire being effective to support the rake arm in said lowermost position relative to the tank bottom under normal sludge raking load conditions, downwardly and rearwardly sloping draft means having its lower end connected to said rake arm, and its upper end connected to said drive arm by a drive connection whereby said drive arm and said rake arm are rotated together, said rake arm during such rotation being adapted to move the sludge in said inner zone towards said sludge discharge means, and to yield rearwardly upwardly along said predetermined path when overriding excessive sediment accumulation in said inner zone while resolving a sludge overload condition therein during continued rotation of the drive arm and rake structure, and outer complementary raking means connected to said outer end portion of the drive arm, and constructed and arranged for moving relatively light sedimentation sludge load from said outer annular zone to said inner zone of sedimentation sludge accumulation.

2. The raking mechanism according to claim 1, wherein said hinge connection comprises a vertical pivotal connection allowing said rake arm to swing about a vertical axis, and a horizontal pivotal connection allowing said rake arm to swing about a horizontal axis, while preventing said rake arm from rotating about its own longitudinal axis.

3. The sedimentation tank according to claim 1, wherein said drive arm extends clear of the overflow level of the tank, and wherein said outer raking means comprise a structure extending from said drive arm downward to the bottom of the tank, and raking blade means connected to the lower end of said structure.

4. The sedimentation tank according to claim 1, wherein said drive arm extends clear of the overflow level of the tank, and wherein said outer raking means comprise structure extending from said drive arm downward to the bottom of the tank, and having rigid connections with said arm, and raking blade means rigidly connected to the lower end of the structure.

5. The sedimentation tank according to claim 1, wherein said drive arm extends clear of the overflow level of the tank, wherein said outer raking means comprise structure extending from said drive arm downward to the bottom of the tank, and wherein said draft means are connected to the lower truss of said drive arm.

6. The sedimentation tank according to claim 1, wherein said feed means comprise an auxiliary feed well for receiving feed slurry, in the form of an annular channel surrounding said thrust bearing and substantially concentric therewith, and connected to the top side of said drive arm structure, an annular main feed well substantially concentric with the vertical axis of rotation of the drive arm, and located below, and in fixed relationship to said drive arm, said main feed well being constructed and arranged so as to provide a pair of radially inwardly open annular flow channels vertically adjacent to one another, and flow passage means constructed and arranged to deliver a pair of streams from said auxiliary feed well into the respective annular flow channels of the main feed well below, said streams being directed into annular countercurrent paths located one above the other, in such a manner that the influent energy is dissipated, and feed pulp delivered downwardly from the feed well is distributed radially evenly in all directions while entering the surrounding body of liquid undergoing sedimentation.

7. The sedimentation tank according to claim 1, wherein said upper and said lower truss are parallel to one another.

8. The sedimentation tank according to claim 1, wherein the structure of said drive arm extends at least partially below the overflow level of the tank.

9. The sedimentation tank according to claim 1, wherein the structure of said drive arm extends substantially below the overflow level of the tank, so that said lower truss of the drive arm extends adjacent to the tank bottom in said outer zone thereof, and wherein said outer sediment raking means comprise raking blades connected to said lower truss.

10. The sedimentation tank according to claim 1, wherein the structure of said drive arm extends substantially below the overflow level of the tank, and wherein said upper and lower truss are parallel to one another.

11. The sedimentation tank according to claim 1, wherein the structure of said drive arm extends substantially below the overflow level of the tank, wherein said upper and said lower truss are parallel to one another so that the outer end portion corresponding to said outer zone extends adjacent to the bottom surface of said outer zone, and wherein said outer sediment raking means comprise raking blades connected to said lower truss.

12. The sedimentation tank according to claim 1, wherein the structure of said drive arm extends substantially below the overflow level of the tank, and wherein said draft means are connected to the upper truss of said drive arm.

13. The sedimentation tank according to claim 1, wherein at least said inner zone is of shallow conical configuration, wherein the structure of said drive arm extends substantially below the overflow level of the tank, wherein said upper truss and said lower truss are parallel to one another, and said lower truss extends radially and adjacent to the bottom surface of said outer zone, and wherein said outer sediment raking means comprise raking blades connected to said lower truss.

14. The sedimentation tank according to claim 1, wherein said outer zone is of shallow conical inclination, and said inner zone is of a conicity of greater inclination than that of said outer zone, wherein said upper truss and said lower truss are parallel to one another and said lower truss extends radially adjacent to the bottom surface of said outer zone, and wherein said outer sediment raking means comprise raking blades connected to said lower truss.

15. The sedimentation tank according to claim 1, wherein said cage structure is of square cross-sectional configuration, comprising four vertical structural corner members, and wherein the cross-sectional area of the arm corresponds substantially to that of the cage structure, with the addition of an auxiliary drive arm extending rearwardly from said main drive arm, and comprising a relatively shortened girder structure and a relatively shortened bladed rake arm having a hinge connection with the cage structure, a guy wire, and a draft connection with said auxiliary arm, effective in the manner of the first mentioned hinge connection, guy wire, and draft connection.

16. The sedimentation tank according to claim 15, with the further addition of a pair of similar lateral foreshortened auxiliary drive arms extending from said cage structure, opposite to one another and at right angles to said main drive arm, said lateral drive arms each having associated therewith a bladed rake arm provided with a hinge connection, guy wire, and draft connection similar to those provided for said rearwardly extending auxiliary drive arm.

* * * * *